United States Patent
Lehr et al.

(10) Patent No.: US 8,863,005 B2
(45) Date of Patent: Oct. 14, 2014

(54) PROPAGATING BUSINESS OBJECT EXTENSION FIELDS FROM SOURCE TO TARGET

(75) Inventors: Matthias Lehr, Weinheim (DE); Stefan Baeuerle, Rauenberg-Rotenberg (DE); Karsten Fanghaenel, Schwetzingen (DE); Daniel Figus, Wallduern (DE); Uwe Schlarb, Oestringen (DE); Bernhard Thimmel, Edingen-Neckarhausen (DE); Daniel Wachs, Mannheim (DE); Steffen Witt, Heidelberg (DE)

(73) Assignee: SAP SE, Walldorf (DE)

( * ) Notice: Subject to any disclaimer, the term of this patent is extended or adjusted under 35 U.S.C. 154(b) by 984 days.

(21) Appl. No.: 12/643,107

(22) Filed: Dec. 21, 2009

(65) Prior Publication Data
US 2011/0154253 A1  Jun. 23, 2011

(51) Int. Cl.
*G06F 3/00* (2006.01)
*G06F 17/30* (2006.01)
*G06Q 10/10* (2012.01)

(52) U.S. Cl.
CPC ................ *G06Q 10/10* (2013.01)
USPC .......................... 715/744; 707/805

(58) Field of Classification Search
USPC ................................ 707/805; 715/744
See application file for complete search history.

(56) References Cited

U.S. PATENT DOCUMENTS

| | | | |
|---|---|---|---|
| 6,014,670 A * | 1/2000 | Zamanian et al. | 1/1 |
| 6,366,917 B1 * | 4/2002 | St. John Herbert, III | 1/1 |
| 6,550,057 B1 * | 4/2003 | Bowman-Amuah | 717/126 |
| 6,999,963 B1 * | 2/2006 | McConnell | 1/1 |
| 7,149,730 B2 * | 12/2006 | Mullins et al. | 1/1 |
| 7,284,005 B1 * | 10/2007 | Wiryawan et al. | 1/1 |
| 7,499,943 B2 * | 3/2009 | Hobbs | 1/1 |
| 7,505,983 B2 | 3/2009 | Wildhagen et al. | |
| 7,797,627 B2 * | 9/2010 | Fong et al. | 715/249 |
| 8,280,923 B2 * | 10/2012 | Robertson et al. | 707/805 |
| 2003/0041095 A1 * | 2/2003 | Konda et al. | 709/201 |
| 2004/0088678 A1 * | 5/2004 | Litoiu et al. | 717/104 |
| 2005/0015732 A1 * | 1/2005 | Vedula et al. | 715/805 |
| 2007/0299704 A1 * | 12/2007 | Wildhagen et al. | 705/7 |
| 2010/0057776 A1 * | 3/2010 | Baeuerle et al. | 707/104.1 |

OTHER PUBLICATIONS

Frank Brunswig et al.; Backend Service Adaptation; US Non-Provisional (Utility) Application; filed Oct. 6, 2008, U.S. Appl. No. 12/246,247, pp. 35.

* cited by examiner

*Primary Examiner* — Steven Sax
*Assistant Examiner* — Wilson Varga

(57) ABSTRACT

A system and method for creating extension fields for business objects are described. In various embodiments, a system includes modules to display business processes and business objects thereof in graphical user interface screens. In various embodiments, the system propagates created extension fields to other business objects via metadata derived from selections in the graphical user interface. In various embodiments, a method for propagating extension fields from one business object to another business object via a data flow between the two business objects is presented. In various embodiments, the method receives instructions from a graphical user interface for the propagation of an extension field and sends instructions to a backend module to propagate the extension field from the source business object to the other business object.

16 Claims, 7 Drawing Sheets

PROPAGATING BUSINESS OBJECT EXTENSION FIELDS FROM SOURCE TO TARGET

TECHNICAL FIELD

The invention relates generally to modifying business objects, and more specifically, to extending business objects on demand via extension fields.

BACKGROUND

Enterprise Information Systems (EIS) provide a technology platform for the modelling and management of business processes and activities. An EIS typically models activities related to the operation of an enterprise, such as human resources, accounting, finance, plant management, sales and distribution, marketing, fleet management, warehouse management, and others. An EIS may model business processes via business objects that could represent tasks or activities of an enterprise, for example.

Extending an EIS is a time-consuming and resource-consuming process and runtime extensions are generally not available on an EIS. Because of the complexity associated with an EIS, extending an EIS involves modelling additional components for the system in a design time environment, testing such additional components, and deploying such additional components in the runtime of the EIS.

SUMMARY

These and other benefits and features of embodiments of the invention will be apparent upon consideration of the following detailed description of preferred embodiments thereof, presented in connection with the following drawings.

In various embodiments, a system is presented. The system of the embodiments displays business processes in a graphical user interface. The system of the embodiments displays business objects and data flows between business objects in a graphical user interface.

In various embodiments, the system receives an extension field for a source business object and a selection of a data flow from the source business object to a target business object. The system stores the extension field for the source business object and the selection of the data flow from the source business object to the target business object in the form of metadata in a repository. Using the metadata, a backend module propagates the extension field to the target business object.

In various embodiments, a method is presented. The method includes receiving an extension field to propagate from a source business object to one or more business objects along data flows between business objects.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
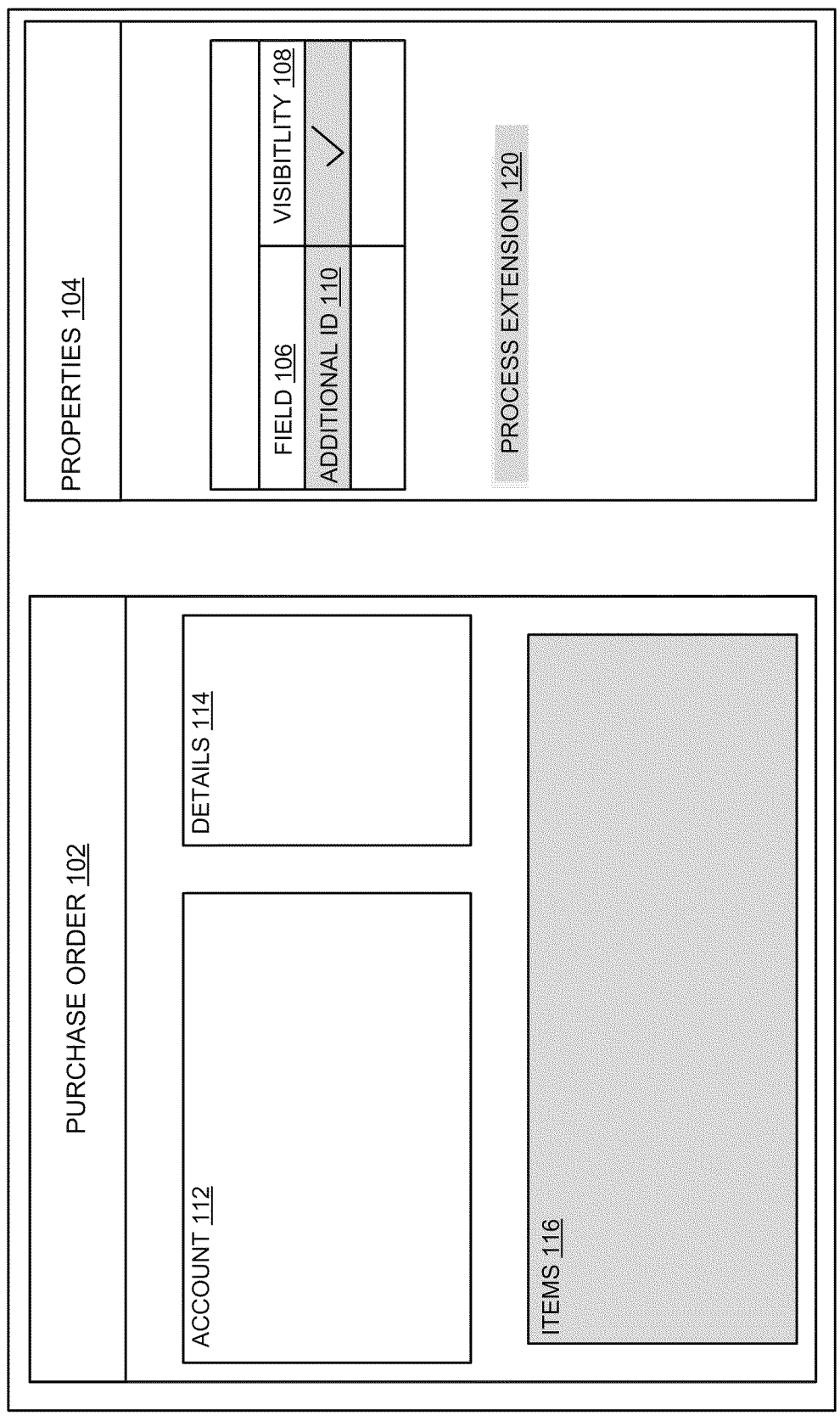
FIG. 1 is an exemplary screen of a business object in a system of an embodiment.

Embodiments of techniques for process field extensibility for business objects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, an Enterprise Information System (EIS) is presented. An EIS enables organizations to manage their business processes and tasks on an Information Technology (IT) platform. Typically, an EIS includes modules for business activities, such as, but not limited to accounting, finance and controlling, human resources, sales, distribution, procurement, warehouse management, and other modules.

A business object in an EIS represents a physical or logical object pertaining to the business activities of an organization. Business objects may encapsulate business logic for a business process or business task. Examples of business objects may be a sales order, an invoice, an account, and others.

In various embodiments, business objects are implemented as structures of nodes (e.g., each field of a business object belongs to a node). For example, an invoice business object may have a "header" as a root node and one or more "items" as children nodes, where the items may store the actual data of the invoice, e.g., invoices items to be paid.

Business objects include one or more fields to specify data needed for the business object. For example, in a "sales order" business object, fields may be specified to store data about the sales order such as a customer that places the order, a good or service that is ordered, and others.

In various embodiments, a business process may include one or more business objects. The business objects in a business process are logically connected to enable the business process to achieve a business goal. In the example above, the "sales order business object" may be part of a "sales" business process. The "sales" business process may include other business objects, for instance, a "lead" business object to specify when sales activities with a customer may develop in a potential sale. Further, the "sales" business process may include an "opportunity" business object to specify when further sales activities have led to a more definite prospect for a sale. Finally, if a sale is accomplished, a "sales order" business object in the "sales" business process may store information about the actual sale.

As mentioned above, business objects in a business process are logically connected. Such logical connections enable the business process to "flow" from one business object to another and achieve the business goal.

Further, connections between one business object and another business object are referred to as "data flows." A data flow is used to specify the flow of data in a business process. For example, if in a "sales" business process initial sales activities result in a lead that might lead to a sale, a "lead" business object is filled with data pertaining to the sales lead. This data may include information about the customer, the sales personnel that performed the sales activity, and details about the lead. At a later point in time, if an opportunity for a sale has been determined, an "opportunity" business object will be filled with data.

However, as a data flow exists between the "lead" business object and the "opportunity" business object, the data from the "lead" business object may be propagated to the "opportunity" business object (e.g., data may "flow" from one object to another). Finally, if a sale is to be accomplished, a "sales order" will be created and the data from the "opportunity" business object will be propagated to the "sales order" business object. Thus, data in a business process is propagated between objects via data flows.

In various embodiments, business objects, data flows between business objects, and fields in business objects may be defined using metadata. Such metadata may be stored in a repository on a database and retrieved for use when needed.

In a graphical user interface, business processes, business objects, and data flows are modeled using graphical elements to enable professionals with little or no technical knowledge to use an EIS.

Typically, and EIS includes a graphical user interface and a backend module to realize the functionality required by the graphical user interface. In various embodiments, an EIS may be hosted on one or more servers and may use one or more databases to store business processes, business objects, data flows, and actual data.

In a backend module, business object fields from a graphical user interface are mapped to physical data fields in a database and data flows between business objects (e.g., connections between fields) are mapped to reference fields. Such mappings may be performed via metadata. Thus, in a backend module, metadata is used to map graphical user interface artifacts to physical data in a database via metadata definition and metadata objects. Metadata may be stored in a metadata repository.

In various embodiments, customers of an EIS may need additional fields in business objects. Such additional fields may not have been envisioned as necessary by an EIS provider. It may be necessary for reporting purposes to add additional fields to business objects to enable diverse reporting scenarios, or to enable grouping of data in business reports in a specific way. For example, a customer of an EIS may need to create reports in which data is grouped by a category field that is not available in the relevant business object that stores the data for the report. Because customer businesses and thus requirements change over time, an EIS provider may not envision every customer requirement or need over an extended period of time. Thus, it may be beneficial to enable customers of EIS to extend business objects with data fields as needed, over time.

In various embodiments, a system may be implemented to provide extensibility for business objects. Such extensibility may be in the form of adding extension fields (e.g., customer-defined data fields) to business objects and propagating such extension fields to other business objects via data flows between the business objects.

In various embodiments, a system may be implemented to enable the generation of extension fields on business objects in a graphical user interface and the propagation of extension fields along data flows between business objects in a backend module.

FIG. 1 is an exemplary screen of a business object in a system of an embodiment. Referring to FIG. 1, the screen displays the purchase order business object 102. The properties panel 104 displays properties of panels selected from the purchase order 102. The purchase order panel 102 displays an account panel 112 to display the information about the account for the purchase order 102. Additional details about the purchase order 102 may be displayed in the details panel 114. The items panel 116 may display one or more items of the purchase order 102.

In various embodiments, a user may add a field to the items panel 116. To add the field, a user selects the items panel 116 (shown highlighted to specify it is selected). Referring to FIG. 1, the Properties panel 104 displays the fields of the items panel 116. After adding the field "additional ID" 110 it is added to the Properties Panel 104. The additional ID field 110 is shown highlighted to specify that the field is created and currently selected. The visibility column 108 of the field 106 table shows a tick to specify that the additional ID field is visible and to be displayed.

In various embodiments, a user may select to propagate the newly created additional ID field 110 by selecting process extension 120. In response to the user selecting process extension 120, a system of an embodiment displays a process extension screen. In various embodiments the displayed process extension screen may be a process extension screen such as exemplary screen of FIG. 2.

Figure 2:
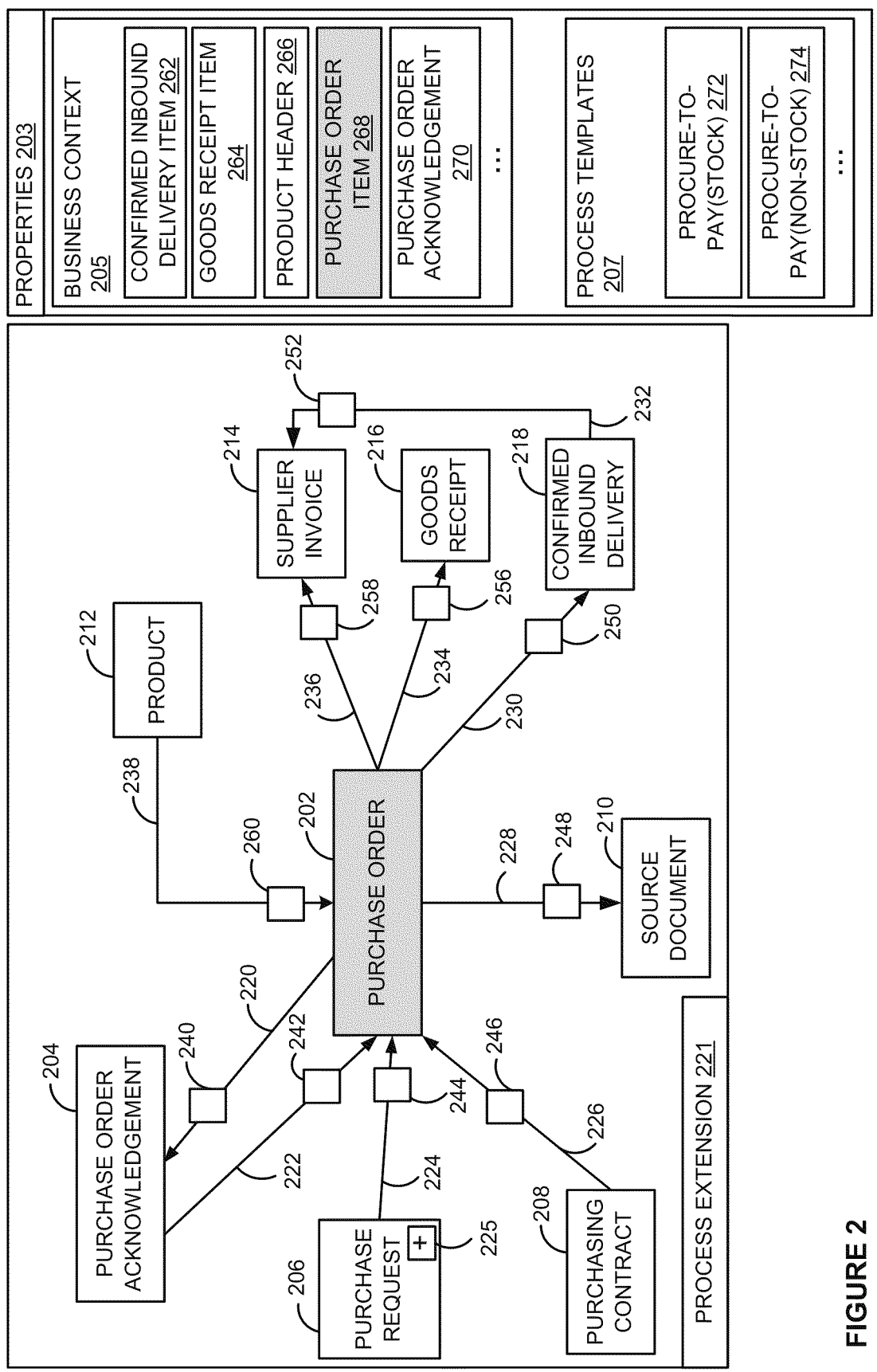
FIG. 2 is an exemplary process model diagram that may be displayed in a graphical user interface in a system according to various embodiments.

FIG. 2 is an exemplary process model diagram that may be displayed in a graphical user interface in a system according to various embodiments. In various embodiments, FIG. 2 may be displayed in response to a user selecting process extension 120 in FIG. 1. Referring to FIG. 2, the process model diagram includes a process extension panel 221. The process extension panel 221 includes business objects in blocks 202 through to 218, for example, purchase order at block 202, purchase request at block 206, and so on. Further, the diagram includes data flows 220 through to 238, for example, data flow 238 from product 212 to purchase order 202. Each of the business objects 202 through to 218 may include one or more fields to specify the data to be stored in the business objects 202 through to 218. In various embodiments, these fields are mapped to physical data fields in a database in a backend module.

The properties panel 203 displays a business context panel 205 for business contexts 262 through to 270. It should be appreciated that the exemplary screen may not fit all available business contexts for all available business objects. If the process extension panel 221 is zoomed to show a specific area of the business process model, the business context panel 205 is updated accordingly.

A business context for a business object describes where a field is added to a business object and is derived from a selected screen area. For example, in FIG. 2, purchase order 202 is highlighted to show purchase order 202 is a source object an extension field is created in. Further, purchase order item 268 is highlighted to show that the extension field is added to the purchase order 202 items panel (e.g., items 116 in FIG. 1).

Further, the properties panel 203 displays process templates available in the system in the process templates panel 207. The process templates panel 207 displays process templates procure-to-pay (stock) 272 and procure-to-pay (non-stock) 274. Further process templates may be displayed if available. The process templates are displayed to show processes created according to the templates and available for extension.

In various embodiments, an extension field may be created for a business object (e.g., additional ID field 110 in FIG. 1). For example, an extension field "additional ID" may be added to purchase order 202 (e.g., purchase order 102 of FIG. 1). Following the addition of the extension field to the business object purchase order 202, one or more of the data flows 220 through to 238 may be selected to specify that the extension field "additional ID" should be propagated to the business objects connected to the purchase order 202 via the selected data flows. Data flows are selected via selection boxes 240 through to 260. For example, if the extension field "additional ID" is to be propagated to purchase request 206 and supplier invoice 214, the relevant boxes 244 for data flow 224 and 258 for data flow 236 may be selected. In various embodiments, purchase order 202 is referred to as "source object" and purchase request 206 and supplier invoice 214 are referred to as "target objects."

Thus, via the selection boxes 240 through to 260, a backend module may receive instructions to propagate the extension field "additional ID" from a source object to one or more target objects.

In various embodiments, the process extension panel 221 may show a process model. However, sub-processes may also exist within the process and may not be initially displayed. Sub-processes may be displayed on demand in response to a user input. For example, the purchase request 206 may be connected to further business objects such as "purchase proposal" and "project purchase request." Such business objects may be displayed if a user chooses a user interface control to expand data flows of the purchase request business object via the plus box 225. If further objects are displayed via a selection of a plus box, such objects may be selected so that an extension field is propagated to them from their parent object (for example, the purchase request 206), when such parent object is also selected for propagation. Thus, a system of various embodiments ensures propagation is consistent.

After the propagation of the extension field to the selected business objects, the extension field is available in the business objects it was propagated to. Thus, users are able to extend an EIS without any development effort in a graphical environment.

Figure 3:
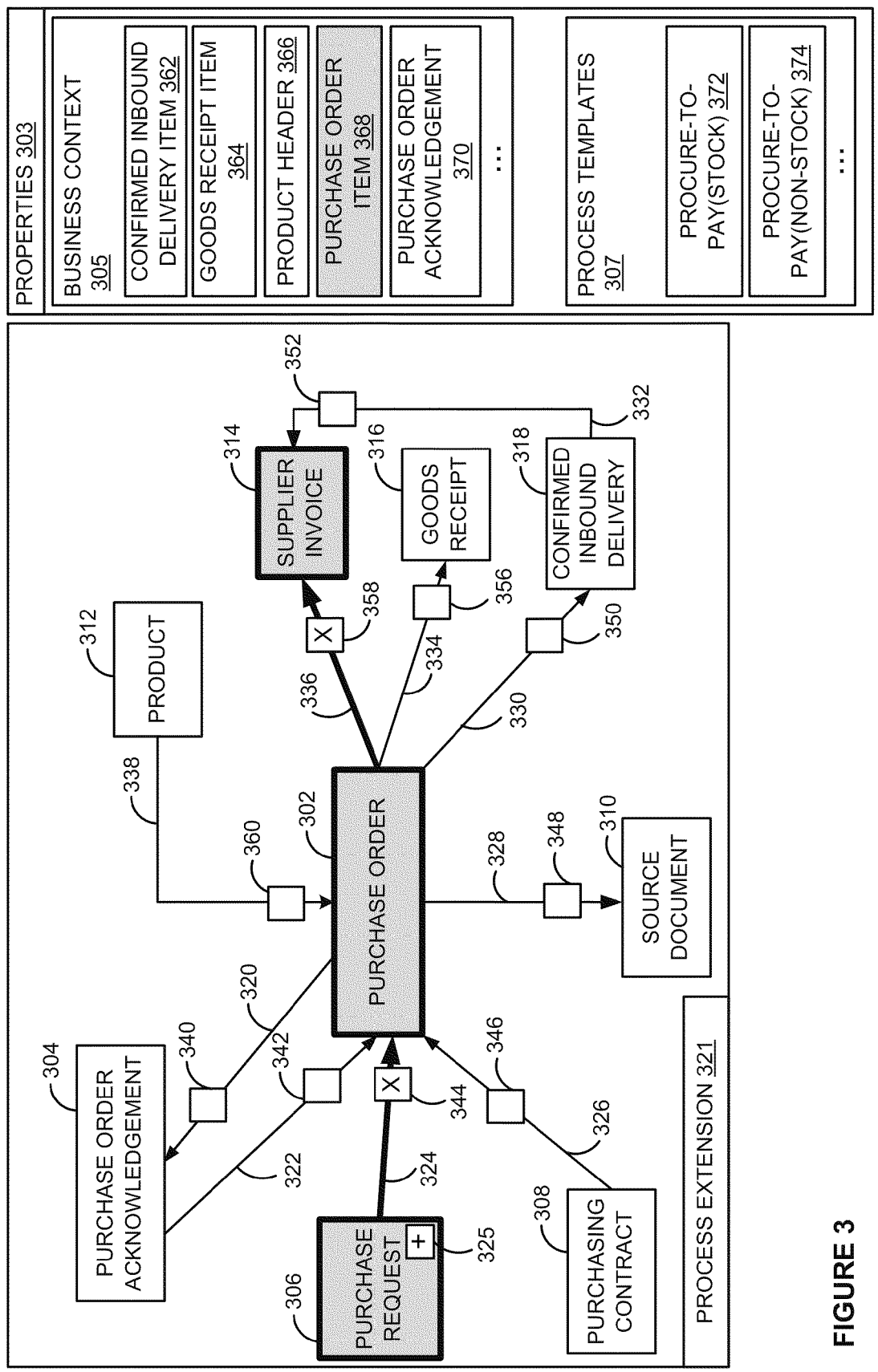
FIG. 3 is an exemplary graphical user interface screen of a system of an embodiment to display selected business objects for propagation.

FIG. 3 is an exemplary graphical user interface screen of a system of an embodiment to display selected business objects for propagation. In various embodiments, the exemplary screen of FIG. 3 may display the objects of FIG. 2 and indicate which objects and data flows are selected for propagation.

Referring to FIG. 3, business objects 302 through to 318 are displayed in the process extension panel 321 (e.g., process extension panel 221 and business objects 202 through to 218 of FIG. 2). The process extension panel 321 displays data flows 320 through to 338 (e.g., data flows 220 through to 238 of FIG. 2); and selection boxes 340 through to 360 for each data flow (e.g., selection boxes 240 through to 260 of FIG. 2).

The properties panel 303 displays business contexts 362 through to 370 in the business context panel 305. The properties panel 303 further displays process templates 372 and 374 in process templates panel 307.

The process extension panel 331 displays the source object purchase order 302 and target objects purchase request 306 and supplier invoice 314 and corresponding data flows 324 and 336 in a highlighted way (e.g., with different color and size) to show that these objects and data flows are to be extended because selection boxes 344 and 358 are selected.

In various embodiments, a system may collect data from the graphical user interface in the form of metadata and send such metadata to a backend module on a server to perform the propagation of extension fields.

Further, after the propagation of an extension field to one or more business objects, the extension field is available in the runtime environment of the EIS and can be used for practical purposes, such as, but not limited to, creating reports based on criteria derived from extension fields, including more content in business objects for business activities, and so on. After the propagation of an extension field to one or more target objects, screens in the graphical user interfaces of various embodiments may display extended business objects in highlighted form to indicate such business objects have been extended with additional fields.

Figure 4:
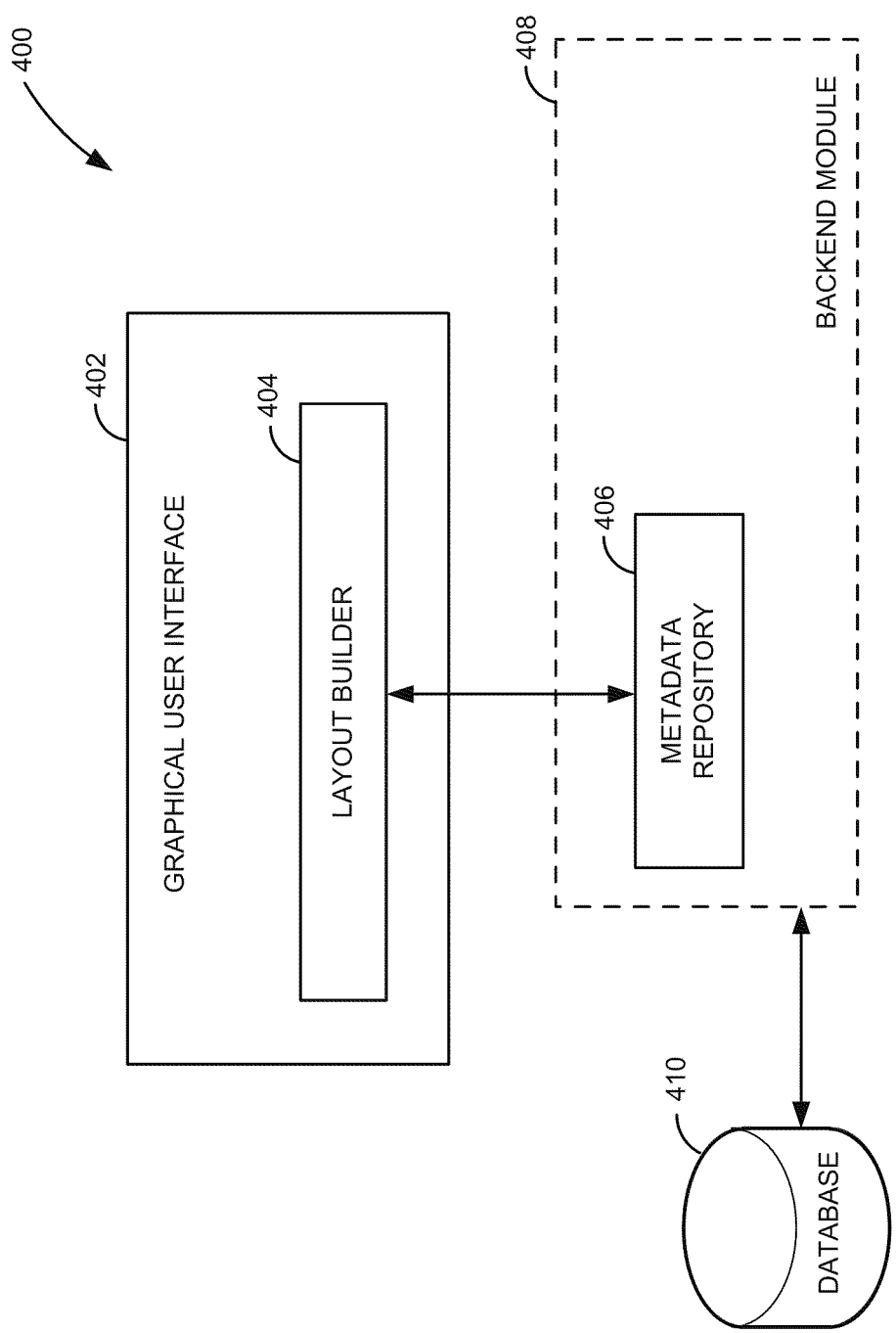
FIG. 4 is a block diagram of an embodiment of a system for creating extension fields on business objects.

FIG. 4 is a block diagram of an embodiment of a system for creating extension fields on business objects. In one embodiment, the exemplary business process of FIGS. 2 and 3 may be created by components as described in FIG. 4. Referring to FIG. 4, the system 400 includes a graphical user interface (GUI) 402 and a backend module 408. The GUI 402 displays business objects, properties of business objects, and fields of business objects on one or more screens. The GUI 402 also displays business processes and business objects thereof via GUI elements (e.g., business objects 202 through 218 of FIG. 2).

Data flows between business processes may be displayed via directed edges (e.g., data flows 220 through 238 of FIG. 2). The backend module 408 stores the elements displayed on the GUI 402 in the metadata repository 406 in the form of metadata.

In various embodiments, metadata may include field definition data, such as field type and label; further, metadata may include persistency data, such as a definition of a field in a database and the logical attachments of the field; metadata may also include data about a position of a field on a screen, and others. Metadata is used as an abstraction between user interface data and underlying database data. The backend module 408 processes metadata. The backend module 408 receives user interface data translated to metadata from the layout builder 404; or vice versa, the backend module 408 sends metadata to the layout builder 404 and the layout builder 404 translates such metadata to graphical user interface elements.

The layout builder 404 receives metadata from the metadata repository 406 and transforms the metadata in graphical elements to display on the GUI 402. If an extension field on a business object displayed in the GUI 402 is created and one or more data flows and one or more corresponding business objects are selected for the extension field to be propagated to, the layout builder 404 creates metadata definitions from instructions received in the GUI 402 and sends the metadata definitions to the backend module 408 to store in the metadata repository 406.

The backend module 408 includes logic to use these metadata definitions to extend underlying business objects (stored in the database 410) by including the extension field in the target business objects. To extend underlying business objects, the backend module 408 uses the metadata to extend the definitions of business objects in the metadata repository 406 and modify the definitions of reference fields in the metadata repository 406 (e.g., reference fields represent data flows in the metadata repository). Using the updated definitions and reference fields, the backend module 408 modifies data representing the business objects and data flows in the database 410. After the extension fields have been propagated to selected business objects and saved to the database 410, the GUI 402 displays business objects in their modified form (e.g., including the extension field) In various embodiments, extended business objects may be displayed in a different manner as compared to non-extended business objects, for example, extended business objects may be highlighted or displayed in a different color. Thus, users can modify business objects to include fields on demand to service a specific business use.

Figure 5:
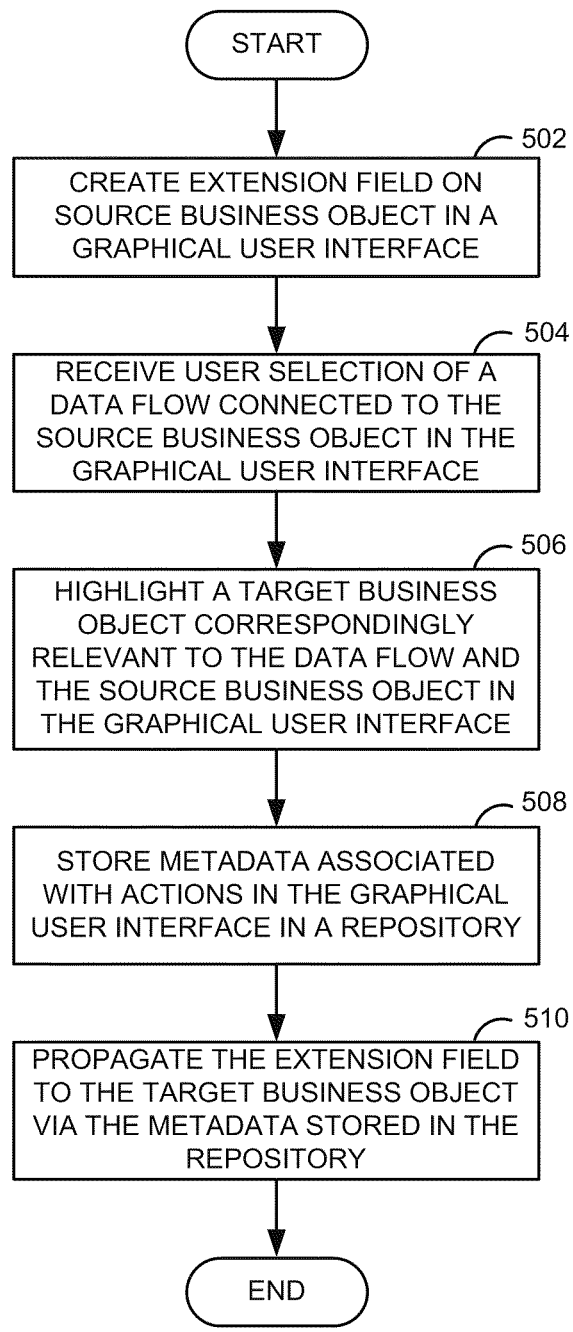
FIG. 5 is a flow diagram of an embodiment of a method for creating extension fields along data flows according to an embodiment.

FIG. 5 is a flow diagram of an embodiment of a method for creating extension fields along data flows according to an embodiment. In various embodiments, the process as described in FIG. 5 may be performed by components as described in FIG. 4.

Referring to FIG. 5, at process block 502, an extension field on a source business object is created (that is, extension field associated with a source business object). At process block 504, a data flow is selected. In various embodiments, one or more data flows may be selected.

At process block 506, a target business object correspondingly relevant to the data flow and to the source business object is highlighted (e.g., the source business object and the target business object are connected via a directed edge in a GUI such as the GUI 402 of FIG. 4). In various embodiments, if more than one data flow is selected in process block 504, all of the business objects connected to the selected data flows are highlighted.

At process block 508, metadata describing the extension field and the selection of business objects and data flow is stored to a repository (e.g., metadata repository 406 of FIG. 4). Such metadata enables a descriptive approach to extending business objects. At process block 510, the extension field is propagated to the target business object using the metadata stored in the repository. The metadata stored in the repository can be translated to lower level instructions to programmatically change business objects and data flows (e.g., change in a database such as database 410 of FIG. 4 by a backend module such as backend module 408 of FIG. 4). However, this functionality is transparent to a user of the system and to a GUI such as the GUI 402 of FIG. 4. Thus, the user does not need to have any technical knowledge to add an extension field to a business object and propagate the extension field to another business object.

Figure 6:
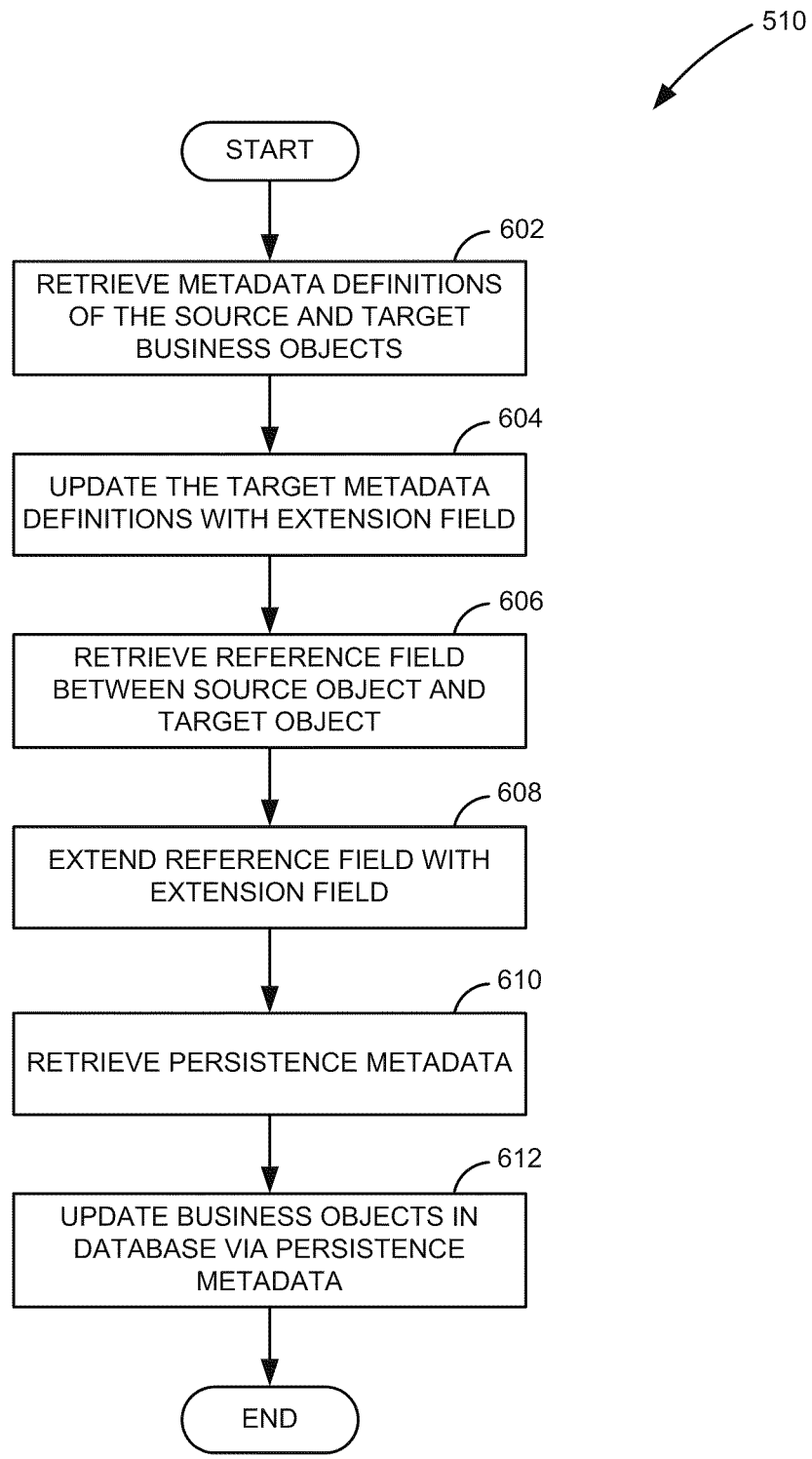
FIG. 6 is a flow diagram of an embodiment of a method for propagating extension fields according to an embodiment.

FIG. 6 is a flow diagram of an embodiment of a method for propagating extension fields according to an embodiment. In various embodiments, the process as described in FIG. 6 is performed by components as described in FIG. 4.

Referring to FIG. 6, at process block 602, metadata definitions of a source and target business objects are retrieved from a metadata repository (e.g., metadata repository 406 of FIG. 4). At process block 604, the metadata definitions are updated with the extension field. At process block 606, a reference field defining the selected data flow is retrieved. At process block 608, the reference field is extended to include information about the extension field. At process block 610, persistence metadata is retrieved for the source and target business objects and the data flow. The persistence metadata specifies how the source and target business objects and the data flow are mapped to data fields in the database. Using the persistence metadata, at process block 612, the business objects and the data flow are updated in the database.

The architecture described in FIG. 4 and the processes described in FIGS. 5 and 6 allow for the implementation and configuration of an EIS that enables end users with no technical knowledge to extend business objects in the system. Thus, time, funds, and resources may be saved. Further, with the opportunity to extend business objects descriptively (as opposed to programmatically), users can create and adapt scenarios relevant to their business and business needs over time with minimal effort.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a source computer system that is remotely located from a target computer system containing an interface level (e.g., a graphical user interface). These source and target computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any article that is capable of undergoing a set of changes to store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
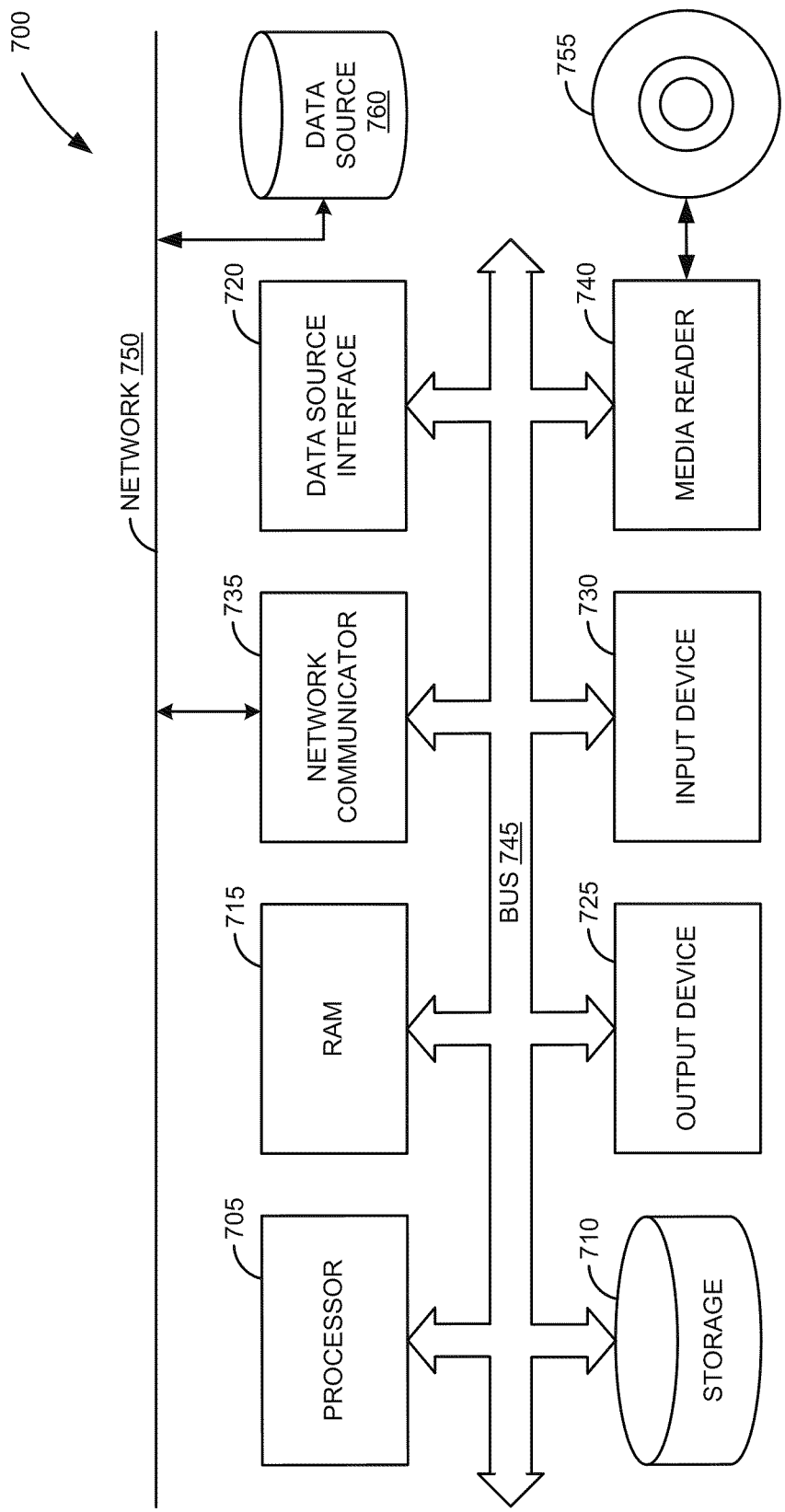
FIG. 7 is a block diagram of an exemplary computer system 500 according to an embodiment.

FIG. 7 is a block diagram of an exemplary computer system 700. The computer system 700 includes a processor 705 that executes software instructions or code stored on a computer readable medium 755 to perform the above-illustrated methods of the invention. The computer system 700 includes a media reader 740 to read the instructions from the computer readable medium 755 and store the instructions in storage 710 or in random access memory (RAM) 715. The storage 710 provides a large space for keeping static data where at least some instructions could be stored for later execution. The stored instructions may be further compiled to generate other representations of the instructions and ally stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, one or more reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a selection of a source business object displayed in a graphical user interface, where a business object exists in an Enterprise Information System and encapsulates business logic for a business process or business task;
   for the selected source business object displayed in the graphical user interface, create an associated extension field in the graphical user interface, the extension field added via a properties panel;
   for the selected source business object, receive a selection of a data flow in the graphical user interface mapped to at least one reference field that corresponds to the selected source business object and a target business object in the graphical user interface, wherein the data flow specifies a logical connection between the source business object and the target business object and wherein the received selection is of a directed edge displayed between the source business object and the target business object in the graphical user interface;
   based on the received selection of the source business object, the created extension field, the target business object and the received selection of the data flow, create metadata and store the metadata in a metadata repository, wherein the metadata comprises metadata definitions corresponding to the source business object, the created extension field, the selected data flow, and the target business object;
   propagate the created extension field from the source business object to the target business object via the metadata stored in the metadata repository by updating the metadata definition corresponding to the target business object with the metadata definition of the created extension field, and adding the extension field to the at least one reference field; and
   based on the propagation, display in the graphical user interface a modified source and target business objects including the extension field.

2. The article of manufacture of claim 1, wherein the metadata stored in the metadata repository is translated to lower level instructions to programmatically change the data flow, the source business object, and the target business object in a database.

3. The article of manufacture of claim 1, wherein based on the updated metadata definition and the at least one reference field, modify data in a database representing the source business object and the target business object and the data flow.

4. The article of manufacture of claim 1, further comprising instructions which when executed by the computer, cause the computer to:
   update the source business object, the target business object and the data flow in a database via a persistence metadata, wherein the persistence metadata specifies the mapping of the source business object, target business object and the data flow to the database.

5. The article of manufacture of claim 1, further comprising instructions which when executed by the computer further cause the computer to:
   translate graphical user interface elements to metadata, wherein the graphical user interface elements comprises the received selection of the source business object, the created extension field, the target business object and the received selection of data flow.

6. A computer-implemented method, comprising:
- receiving a selection of a source business object displayed in a graphical user interface where a business object exists in an Enterprise Information System and encapsulates business logic for a business process or business task;
- for the selected source business object displayed in the graphical user interface, creating an associated extension field in the graphical user interface by displaying a plurality of input fields in the graphical user interface, the plurality of input fields to store data about the extension field, and the plurality of input fields comprising: a name field; a data type field; a field label field; a value field; and a reference field;
- for the selected source business object, receiving a selection in the graphical user interface of a data flow mapped to at least one reference field that corresponds to the selected source business object and a target business object in the graphical user interface, the selection of the data flow performed via highlighting directed edges connecting the source business object to the target business object responsive to a mouse click event;
- based on the received selection of the source business object, created extension field, the target business object and the received selection of the data flow create metadata and store the metadata in a metadata repository, wherein the metadata comprises metadata definitions corresponding to the source business object, the created extension field, the selected data flow, and the target business object;
- propagating the created extension field from the source business object to the target business object via the metadata stored in the metadata repository by updating the metadata definition corresponding to the target business object with the metadata definition of the created extension field, and adding the extension field to the at least one reference field; and
- based on the propagation, display in the graphical user interface a modified source and target business objects including the extension field.

7. The method of claim 6, further comprising:
- displaying a graphical user interface control to zoom a screen of the graphical user interface at a more detailed level for display of a business process associated with the source business object and the target business object; and
- displaying the graphical user interface control to zoom the screen of the graphical user interface at a less detailed level for display of the business process.

8. The method of claim 6, wherein propagating the extension field comprises:
- propagating the generated extension field from the source business object to a parent business object associated with the target business object.

9. The method of claim 6, further comprises:
- translate graphical user interface elements to metadata, wherein the graphical user interface elements comprises the received selection of the source business object, the created extension field, the target business object and the received selection of data flow.

10. The method of claim 6, wherein the metadata stored in the metadata repository is translated to lower level instructions to programmatically change the data flow, the source business object, and the target business object in a database.

11. The method of claim 6, wherein based on the updated metadata definition and the at least one reference field, modify data in a database representing the source business object and the target business object and the data flow.

12. A computer system for creating extension fields associated with business objects, comprising:
- one or more processors, a memory coupled to the one or more processors, one or more programs, stored in the memory, configured for execution by the one or more processors, the one or more programs comprising instructions to:
- receive a selection of a source business object displayed in a graphical user interface, where a business object exists in an Enterprise Information System and encapsulates business logic for a business process or business task;
- for the selected source business object displayed in the graphical user interface, create an associated extension field in the graphical user interface, the extension field added via a properties panel;
- for the selected source business object, receive a selection of a data flow in the graphical user interface mapped to at least one reference field, that corresponds to the selected source business object and a target business object in the graphical user interface, wherein the data flow specifies a logical connection between the source business object and the target business object and wherein the received selection is of a directed edge displayed between the source business object and the target business object in the graphical user interface;
- based on the received selection of the source business object, the created extension field, the target business object and the received selection of the data flow, create metadata and store the metadata in a metadata repository, wherein the metadata comprises metadata definitions corresponding to the source business object, the created extension field, the selected data flow, and the target business object;
- propagate the created extension field from the source business object to the target business object via the metadata stored in the metadata repository by updating the metadata definition corresponding to the target business object with the metadata definition of the created extension field, and adding the extension field to the at least one reference field; and
- based on the propagation, display in the graphical user interface a modified source and target business objects including the extension field.

13. The computer system of claim 12, wherein the metadata stored in the metadata repository is translated to lower level instructions to programmatically change the data flow, the source business object, and the target business object in a database.

14. The computer system of claim 12, wherein based on the updated metadata definition and the at least one reference field, modify data in a database representing the source business object and the target business object and the data flow.

15. The computer system of claim 12, wherein the one or more programs further include instructions to:
- update the source business object, the target business object and the data flow in a database via a persistence metadata, wherein the persistence metadata specifies the mapping of the source business object, target business object and the data flow to the database.

16. The computer system of claim 12, wherein the one or more programs further comprise instructions to:
- translate graphical user interface elements to metadata, wherein the graphical user interface elements comprises the received selection of the source business object, the created extension field, the target business object and the received selection of data flow.

* * * * *